Figures 1, 2:
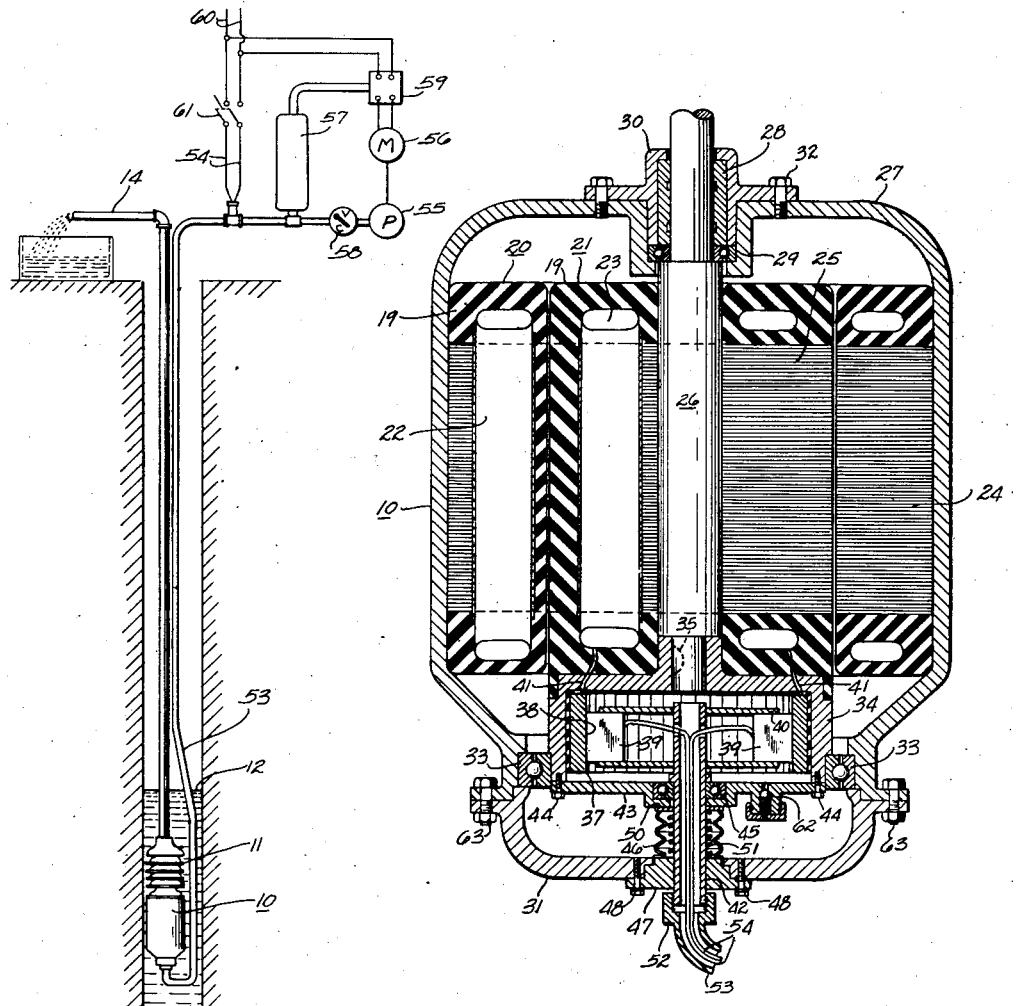

March 13, 1945.  F. J. SIGMUND ET AL  2,371,193
DYNAMOELECTRIC MACHINE
Filed Sept. 22, 1942

INVENTORS.
FRANK J. SIGMUND &
BY  WILLIAM S. HLAVIN
Hoodling and Krost attys

Patented Mar. 13, 1945

2,371,193

UNITED STATES PATENT OFFICE 2,371,193

DYNAMOELECTRIC MACHINE

Frank J. Sigmund and William S. Hlavin, Cleveland, Ohio, assignors, by mesne assignments, to Sigmund Corporation, a corporation of Ohio Application September 22, 1942, Serial No. 459,258

4 Claims. (Cl. 172—36)

Our invention relates in general to dynamoelectric machines and more particularly to plastic-tight winding elements which may be submersed in liquid or operated at high speeds and voltages and which will withstand a great deal of vibration without damage. This application deals particularly with direct current dynamoelectric machines having commutators or other electrically conducting rings against which brushes engage.

An object of our invention is the provision of constructing a dynamo-electric machine having brushes and a commutator or a rotating electrical conducting ring, so that the entire motor may be immersed in liquid without damage being done to the brushes and the commutator or the rotating electrical conducting ring.

The term "plastic-tight" refers to the fact that the winding elements have been made tight by the use of plastics or any other similar material which may be castable, or injected about the winding elements and the commutator or the electrical rotating conducting ring to render the parts water-proof, dust-proof, insulation-proof and vibration-proof.

Another object of our invention is the provision of employing a castable or ejectable material for making the windings of a dynamo-electric machine, including the brushes and the commutator or the rotating electrical conducting ring against which the brushes engage, plastic-tight.

The term "castable" includes plastic-tight materials which have been either poured or injected into the dies or molds, that is, the term "castable" includes ejected material as well as cast material. The terms "plastic-tight" and "liquid-tight" will be used interchangeably to denote the same thing.

Another object of our invention is the provision of "an internal" commutator or rotating electrical conducting ring having an internal cylindrical surface against which the brushes bear.

Another object of our invention is the provision of housing the brushes and the commutator or rotating electrical conducting ring from external exposure and for introducing gas under pressure within the housing to keep the brushes in operative condition.

In this application, the term "commutator" not only embraces the commutator for a direct current machine but also includes slip rings for dynamo-electric machines and the term "commutator" will be used interchangeably with the phrase "rotating electrical conducting ring."

Other objects and a fuller understanding of our invention may be had by referring to the following description and claims, taken in conjunction with the drawing, in which:

Figure 1 illustrates a side elevational view of a dynamo-electric machine and a pump immersed in a liquid, wherein the motor and the pump are operated below the level of the liquid, and Figure 2 is an enlarged cross-sectional view of the motor as shown in Figure 1 and illustrates particularly the construction of the "internal" commutator.

Although we have illustrated in Figure 2 a direct current commutator motor, it is to be understood that our invention applies equally well to a dynamo-electric machine having slip rings against which the brushes bear.

With reference to the drawing, the dynamoelectric machine which is illustrated as being a motor, is designated by the reference character 10 and is arranged to operate a pump 11 which may be directly connected thereto as a unit, wherein the unit may be immersed in a body of liquid illustrated by the reference character 12. The pump is provided with a discharge pipe 14 which delivers the liquid 12 to a discharge container or other place. In Figure 1, the liquid 12 is shown as being in a well or a sump, but it is to be understood that the liquid may be any body of water or other liquid regardless of its location.

With reference to Figure 2, the motor 10 comprises generally a liquid-tight stator 20, a liquid-tight armature 21 which is arranged to rotate on a shaft 26 that is supported within a housing 27 which also carries the liquid-tight stator 20. The stator windings 22 and the armature windings 23 are rendered plastic-tight by means of a castable resin which is indicated in both instances by the reference character 19. The castable resin 19 may be applied to the stator windings and the armature windings in a manner as described in our pending application Serial No. 450,240 filed July 9, 1942, and entitled Liquid-tight stator. The castable resin 19 is firmly and securely molded around the stator core 24 and the armature core 25 so as to give a rigid support for the windings which not only renders the windings liquid-tight but also enables the armature to be operated at high speed and which will withstand a great deal of vibration without damage. Also, the castable resin 19 enables the windings to be operated at high voltages since the castable resin forms a good insulating material completely around the windings. The upper end of the shaft 26 in Figure 2 is supported by a bushing 28 and a bearing 29 which are housed in a housing 30 fastened to the main housing 27 of the motor by means of screws 32 or other suitable means. In operation, the liquid surrounding the motor is caused to flow by reason of the rotation of the shaft 26 within the bushing 28 in between the clearance space between the shaft 26 and the bushing to lubricate the shaft as well as the bearings 29. The lower end of the main housing 27 of the motor is provided with a removable end housing 31 which may be removably connected by means of the screws 63 or other suitable means.

Anchored to the lower end of the shaft 26 is a commutator housing 34 which may be securely fastened to the shaft 26 by means of the key 35 or any other suitable means. As illustrated, the commutator housing 34 is supported by bearings 33 within the main housing 27 of the motor. By means of this construction, the armature is arranged to rotate within the stator upon the bearings 33, and the bearing 29, together with the bushing 28. As shown, the castable resin upon the armature is arranged to overlap the commutator housing 34 in order to make a good fluid-tight connection between the commutator housing 34 and the windings 23 for the armature. Mounted internally of the commutator housing 34 are the commutator bars 37 having a cylindrical internal surface 38 against which the brushes 39 bear. The commutator bars are connected to the armature windings by means of leads 41 extending from each of the commutator bars to the windings of the armature. The commutator bars 37 may be securely mounted within the commutator housing 34 in any suitable manner and may be insulated therefrom in accordance with usual commutator insulation constructions. The brushes 39 are arranged to be supported within brush housings 40 which are carried upon the end of a tubular sleeve 42 through which the electrical conductors 54 pass which energize the brushes 39. The springs or other devices for urging the brushes 39 against the internal surface of the commutator are not shown for the sake of simplicity, but may embody any suitable construction for urging the brushes resiliently against the internal surface of the commutator. The brushes and the internal commutator are housed and sealed within the illustrated compartment by means of a cover plate 43 which may be mechanically connected to the lower end of the commutator housing 34 by means of screws 44 or other suitable means. The tubular sleeve 42 is supported within the cover plate 43 by means of bearings 45 which are sealed air-tight by means of a bellows seal 46 which is fastened to a seal cap 47 fitting tightly in the end housing 31 by means of the screws 48 or other suitable means. The upper end of the bellows seal 46 carries a seal face 50 which makes a good sealing engagement with the cover plate 43. The seal face 50 is urged against the cover plate 43 by means of a spring 51 in order to keep the seal in perfect running condition at all times. Although we have shown a bellows type of seal for sealing the space between the tubular sleeve 42 and the cover plate 43, it is to be understood that any other suitable type of seal may be employed for this purpose. The lower or outside end of the tubular sleeve 42 is provided with a suitable fitting 52 which connects a tube 53 thereto that leads to a place above the motor and pump unit as illustrated in Figure 1. The tube 53 not only houses the electrical conductors 54 that energize the motor, but also constitutes a conduit for carrying air or gas under pressure to the closed commutator housing. As illustrated in Figure 1 of the drawing, air or other gas may be applied to the commutator housing by means of a pump 55 driven by a motor 56. The pump supplies air or gas under pressure through the tube 53 and an air reservoir 57 as a reserve supply. A check valve 58 is placed between the pump 55 and the air reservoir 57 in order to prevent the fluid leaking back through the pump 55 when the pump is not being operated. The motor 56 is governed by a pressure responsive switch indicated by the reference character 59 and is arranged such that when the pressure within the air reservoir 57 attains a pre-determined value, the motor 56 is de-energized and when the air pressure drops down below a pre-determined value the motor 56 is energized through the pressure switch 59. The motor 56 and the main motor 10 are energized from a source of supply indicated by the reference character 60 and the motor 10 may be started and stopped by the control of a switch 61. The electrical arrangement is such that the commutator housing is supplied with pressure at all times regardless of whether the motor 10 is operating or not. A relief valve 62 is provided in the cover plate 43 so that in the event the pressure becomes too high in the commutator housing the gas or air may escape through the relief valve 62. The maintenance of air or gas under pressure in the commutator housing keeps the liquid in which the motor is immersed from seeping or entering into the commutator housing, with the result that the brushes and the commutator bars are kept perfectly dry under all operating conditions. Also, the escaping of the air or gas through the relief valve 62 enables an exchange of air which keeps the commutator and the brushes cool.

Inasmuch as the commutator is enclosed within the commutator housing, the construction of the commutator itself may be radial with the brushes bearing against a flat face as well as of the internal cylindrical type as shown in the drawing. In the case of slip rings, they may be made concentric with each other and mounted to have the brushes engage the flat face thereof.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In a dynamo-electric machine having brushes and an electrical conducting surface against which the brushes bear, the improvement of a liquid-tight stator and a liquid-tight armature, said improvement comprising a stator winding embedded in a mass of insulating material, an armature winding embedded in a mass of insulating material and electrically connected to the said electrical conducting surface, a housing for enclosing the brushes and the electrical conducting surface from external exposure, and means for supplying a gas under pressure to the said housing.

2. In a dynamo-electric machine having brushes and an electrical conducting surface against which the brushes bear, the improvement of a liquid-tight stator and a liquid-tight armature, said improvement comprising a stator winding embedded in a mass of insulating material, an armature winding embedded in a mass of insulating material and electrically connected to the said electrical conducting surface, a housing mounted upon the end of the armature for enclosing the brushes and the electrical conducting surface from external exposure, and means for supplying a gas under pressure to the said housing.

3. In a dynamo-electric machine having brushes and an electrical conducting surface against which the brushes bear, the improvement of a liquid-tight stator and a liquid-tight armature, said improvement comprising a stator winding embedded in a mass of insulating material, an armature winding embedded in a mass of insulating material and electrically connected to the said electrical conducting surface, a housing mounted upon the end of the armature for enclosing the brushes and the electrical conducting surface from external exposure, means for supplying a gas under pressure to the said housing, bearing means for rotatively supporting the armature within the stator, said bearing means including a bearing engaging the housing for the brushes and the electrical conducting surface.

4. In a dynamo-electric machine having brushes and an electrical conducting surface against which the brushes bear, the improvement of a liquid-tight stator and a liquid-tight armature, said improvement comprising a stator winding embedded in a mass of insulating material, an armature winding embedded in a mass of insulating material and electrically connected to the said electrical conducting surface, a housing mounted upon the end of the armature for enclosing the brushes and the electrical conducting surface from external exposure, means for supplying a gas under pressure to the said housing, bearing means for rotatively supporting the armature within the stator, said bearing means including a bearing engaging the housing for the brushes and the electrical conducting surface, said housing having a relief valve for permitting the gas to escape from the housing upon attaining a predetermined pressure.

FRANK J. SIGMUND.
WILLIAM S. HLAVIN.